US012436522B1

(12) United States Patent
Qiao et al.

(10) Patent No.: US 12,436,522 B1
(45) Date of Patent: Oct. 7, 2025

(54) END-EDGE-CLOUD COLLABORATIVE FURNACE TEMPERATURE (FT) CONTROL METHOD AND SYSTEM IN MUNICIPAL SOLID WASTE INCINERATION (MSWI) PROCESS

(71) Applicant: BEIJING UNIVERSITY OF TECHNOLOGY, Beijing (CN)

(72) Inventors: Junfei Qiao, Beijing (CN); Yahui Peng, Beijing (CN); Xi Meng, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/975,328

(22) Filed: Dec. 10, 2024

(30) Foreign Application Priority Data

Apr. 8, 2024 (CN) .......................... 202410410675.7

(51) Int. Cl.
G05B 19/4155 (2006.01)

(52) U.S. Cl.
CPC .............. *G05B 19/4155* (2013.01); *G05B 2219/50333* (2013.01)

(58) Field of Classification Search
None
See application file for complete search history.

(56) References Cited

U.S. PATENT DOCUMENTS

2020/0056785 A1* 2/2020 VanNatta .................. F23G 5/24

FOREIGN PATENT DOCUMENTS

CN 111814402 A * 10/2020 ............. C21D 11/00

OTHER PUBLICATIONS

Ding et al, "Prediction Model of Dioxin Emission Concentration in MSW Incineration Process Based on Stochastic Configuration Network", 2020, 7th International Conference on Information Science and Control Engineering, pp. 2036-2040 (Year: 2020).*
Lim et al, "Dynamic edge association and resource allocation in self-organizing hierarchical federated learning networks,", Dec. 2021, IEEE J. Sel. Areas Commun. vol. 39 No. 12, pp. 3640-3653 (Year: 2021).*
Duan et al, "Distributed Artificial Intelligence Empowered by End-Edge-Cloud Computing: A Survey", 2023, IEEE Communications Surveys & Tutorials, vol. 25, No. 1, pp. 591-624 (Year: 2023).*

* cited by examiner

*Primary Examiner* — David Earl Ogg
(74) *Attorney, Agent, or Firm* — WCF IP

(57) ABSTRACT

Provided are an end-edge-cloud collaborative furnace temperature (FT) control method and system in a municipal solid waste incineration (MSWI) process, which relates to the field of FT control. Process data of the MSWI process are obtained in real time, and the acquire process data are processed. An FT prediction model is established according to received data, the prediction model is updated based on a self-correcting mechanism (SCM), and the established model is delivered to an edge side. An FT prediction model established and updated online on a cloud side is used to predict FT on the edge. An objective function is optimized by using a gradient descent method, an optimal control law (OCL) is solved, and an execution device is adjusted according to the calculated control law. This implements stable and accurate control of the FT in the MSWI process.

5 Claims, 4 Drawing Sheets

END-EDGE-CLOUD COLLABORATIVE FURNACE TEMPERATURE (FT) CONTROL METHOD AND SYSTEM IN MUNICIPAL SOLID WASTE INCINERATION (MSWI) PROCESS

CROSS REFERENCE TO RELATED APPLICATION

This patent application claims the benefit and priority of Chinese Patent Application No. 2024104106757, filed with the China National Intellectual Property Administration on Apr. 8, 2024, the disclosure of which is incorporated by reference herein in its entirety as part of the present application.

TECHNICAL FIELD

The present disclosure relates to the field of MSWI control, and in particular, to an end-edge-cloud collaborative FT control method and system in an MSWI process.

BACKGROUND

Municipal solid waste (MSW) refers to solid waste generated in daily life or activities providing services for daily life. Around 2 billion tons of MSW are generated each year in the world. By 2050, a total amount of MSW in the world is expected to reach 3.4 billion tons. An issue of MSW pollution abatement is becoming increasingly prominent. The methods for MSW treatment include landfill, composting and incineration. In a high-temperature oxygen-rich environment, MSWI converts organic matter into inorganic matter through pyrolysis, oxidation, and combustion, while toxic and harmful substances in the solid waste are eliminated. Moreover, MSWI can significantly reduce the volume and the mass of MSW, while obtaining renewable energy. The MSWI has characteristics of reduction, harmlessness and resource utilization, and has become the main way to manage MSW pollution in various countries around the world. As an important process parameter in the MSWI process, an FT is a key to ensure full combustion of the MSW and reduce the generation of gas pollutants. A higher furnace temperature is conducive to rapid and complete drying and volatilization of MSW in a furnace, ensuring complete combustion in the process. In addition, the higher furnace temperature is also conducive to reducing emission of dioxin. However, when the temperature is too high, emission of nitrogen oxide increases greatly. In addition, an excessive furnace temperature may bring about related problems such as an increased burden on a furnace body due to high-temperature slagging. Therefore, a stable and efficient FT control technology is a research focus in controlling the MSWI process.

However, the MSWI process involves various and complex physical and chemical reactions, and the solid waste undergoes seasonal and geographical variations in both composition and property, posing a challenge to control the FT stably in the MSWI process. Model predictive control (MPC) is an advanced control strategy based on objective function optimization in a specific range. The MPC can compensate for uncertainties caused by time-varying, and interference, and the like, and can handle constrained, multi-variable, and multi-objective control problems. However, a key factor that affects a control performance of the MPC is establishment of a nonlinear prediction model. A data-driven modeling method using fuzzy neural network (FNN) can implement nonlinear mapping with any precision without deeply understanding the process mechanism. In an actual incineration process, due to interference such as complexity and variability of a solid waste composition and unknown wear of a device, a process model often changes with time, and consequently, an offline data-driven model may not accurately represent the dynamic behaviors of MSWI process after the interference occurs, thereby affecting control performance of a model predictive controller. Therefore, how to effectively construct an FNN-based prediction model with a compact structure and good prediction performance and design a proper self-correcting mechanism (SCM) are still one of key issues in the design of data-driven MPC.

In addition, it is difficult for a conventional distributed control system (DCS) to meet a basic condition for practical application of the foregoing theoretical method in the field of MSWI. To be specific, the DCS system has a limited calculation capability, which makes it difficult to implement complex algorithm calculation and mathematical modeling. It is difficult for the DSC system to cope with the MPC, which requires real-time calculation and whose algorithm has a large amount of calculation. The DCS system usually uses a communication mode such as a field bus, and a data transmission speed is limited. In an actual process, the DSC system may not be able to respond to and transmit real-time data in a timely manner, resulting in a control error. The DCS system usually uses a storage medium such as a non-volatile memory chip or a solid-state disk, which has a limited storage capacity. However, in the actual process, it is necessary to record a large amount of process data and historical data in real time, to support subsequent control analysis and controller optimization.

SUMMARY

The present disclosure aims to provide an end-edge-cloud collaborative FT control method and system in an MSWI process, to improve control precision of an FT in the MSWI process.

To achieve the above objective, the present disclosure provides the following technical solutions.

A end-edge-cloud collaborative FT control method in an MSWI process includes: obtaining process data of MSWI at a previous moment, where the process data includes an FT, a primary air flow, a secondary air flow, a primary air heating temperature, a secondary air heating temperature, and a grate speed;

determining an FT prediction value at a current moment by using a current FT prediction model according to the process data at the previous moment, where the current FT prediction model is obtained by updating a network parameter of an FT prediction model at the previous moment by using an SCM; an FT prediction model at an initial moment is obtained by determining a network structure and a network parameter of an FNN by using a self-organizing mechanism and an improved second-order algorithm based on a sample dataset; the network parameter includes an antecedent parameter and a consequent parameter; the antecedent parameter includes a center vector and a width; the consequent parameter includes a connection weight; the sample dataset includes process data at a historical moment and an expected FT; and the FNN includes an input layer, a radial basis function (RBF) layer, a normalized layer, and an output layer; and optimizing and solving an objective function by using a gradient descent method according to the FT prediction value at the current moment and a set FT value at the current moment, and determining an optimal control law (OCL), to control the FT according to the OCL, where the OCL includes a primary air flow adjustment amount, a secondary air flow adjustment amount, and a primary air heating temperature adjustment amount.

Optionally, the determining an FT prediction value at a current moment by using a current FT prediction model according to the process data at the previous moment specifically includes: denoising the process data at the previous moment to obtain denoised process data at the previous moment; and determining the FT prediction value at the current moment by using the current FT prediction model according to the denoised process data at the previous moment.

Optionally, a process of constructing the FT prediction model at the initial moment specifically includes: determining an initial network parameter of a first neuron at the normalized layer and an initial network parameter of a first neuron at the RBF layer in an initial FNN according to process data at a historical moment corresponding to a maximum expected FT in the sample dataset, to obtain a current FNN, where quantities of neurons at the normalized layer and the RBF layer in the initial FNN are both 0;

adjusting an initial network parameter of the current FNN by using the improved second-order algorithm, to obtain an adjusted FNN;

inputting process data at each historical moment to the adjusted FNN to obtain a predicted FT;

determining an error between the predicted FT and the expected FT corresponding to the process data at the historical moment;

determining an initial network parameter of a next neuron at the normalized layer and an initial network parameter of a next neuron at the RBF layer according to process data at a historical moment corresponding to a peak point of the error, to obtain a next FNN; and determining whether a quantity of neurons at the normalized layer of the next FNN reaches a quantity threshold or whether prediction precision of the next FNN reaches a precision threshold; and if yes, pruning the neurons at the normalized layer and the neurons at the RBF layer according to activation strength of the neurons at the normalized layer, to obtain the FT prediction model at the initial moment; or if no, using the next FNN as the current FNN, and returning to the step of "adjusting an initial network parameter of the current FNN by using the improved second-order algorithm, to obtain an adjusted FT prediction model".

Optionally, the updating a network parameter of an FT prediction model at the previous moment by using an SCM specifically includes: determining activation strength of all fuzzy rules in the FT prediction model at the previous moment; and determining whether the activation strength is greater than an activation strength threshold; and if yes, updating, by using a least squares method, a consequent parameter of a fuzzy rule that is in the FT prediction model at the previous moment and whose activation strength is greater than the activation strength threshold, to obtain an FT prediction model at the current moment; or if not, updating, by using the improved second-order algorithm, antecedent parameters and consequent parameters of all fuzzy rules of the FT prediction model at the previous moment, to obtain an FT prediction model at a current moment.

Optionally, the objective function is $$\hat{J}(t) = \rho_0 [r(t) - \hat{y}(t)]^T [r(t) - \hat{y}(t)] + \sum_{i=1}^{3} \rho_i \Delta u_i(t)^T \Delta u_i(t),$$

where
r(t) is a vector of a set FT value at a moment t; $\hat{y}(t)$ is a vector of an FT prediction value at the moment t; $\Delta u_i(t)$ is an adjustment amount vector of an i-th control variable at the moment t, where i=1, 2, 3, and the control variable is a primary air flow, a secondary air flow, or a primary air heating temperature; $\rho_0$ and $\rho_i$ are control weight factors.

A end-edge-cloud collaborative FT control system in an MSWI process is configured to implement the foregoing end-edge-cloud collaborative FT control method in an MSWI process, and includes: an end side, an edge side, and a cloud side connected in sequence.

The end side includes sensing devices and execution devices; the sensing devices include a temperature sensor and an air flow sensor; each of the sensing devices is configured to acquire process data at each moment of MSWI; and the execution devices include a primary fan, a secondary fan, and an air preheater.

The edge side is configured to store the process data at each moment, and is configured to: obtain process data of MSWI at a previous moment, where the process data includes an FT, a primary air flow, a secondary air flow, a primary air heating temperature, a secondary air heating temperature, and a grate speed;

determine an FT prediction value at a current moment by using a current FT prediction model according to the process data at the previous moment, where the current FT prediction model is obtained by updating a network parameter of an FT prediction model at the previous moment by using an SCM; an FT prediction model at an initial moment is obtained by determining a network structure and a network parameter of an FNN by using a self-organizing mechanism and an improved second-order algorithm based on a sample dataset; the network parameter includes an antecedent parameter and a consequent parameter; the antecedent parameter includes a center vector and a width; the consequent parameter includes a connection weight; the sample dataset includes process data at a historical moment and an expected FT; and the FNN includes an input layer, an RBF layer, a normalized layer, and an output layer;

optimize an objective function by using a gradient descent method according to the FT prediction value at the current moment and a set FT value at the current moment, and determine an OCL, where the OCL includes a primary air flow adjustment amount, a secondary air flow adjustment amount, and a primary air heating temperature adjustment amount;

send the OCL to the end side to control the FT.

The cloud side is configured to: determine the network structure and the network parameter of the FNN based on the sample dataset by using the self-organizing mechanism and the improved second-order algorithm, to obtain the FT prediction model at the initial moment; update the network parameter of the FT prediction model at the previous moment by using the SCM, to obtain an FT prediction model at the current moment; and send the FT prediction model at the current moment to the edge side.

According to the specific embodiments provided in the present disclosure, the present disclosure has the following technical effects: The present disclosure provides the end-edge-cloud collaborative FT control method and system in an MSWI process. The end side obtains the process data of the MSWI process in real time. The edge side processes the acquired process data and transmits the process data to the cloud side. The cloud side stores the received data, establishes the self-organizing FNN prediction model (the FT prediction model) according to the received data, adjusts the network parameter based on the SCM, and delivers the established model to the edge server. The edge side predicts the FT by relying on the FT prediction model established and updated online on the cloud side, optimizes the objective function by using the gradient descent method, solves the OCL, and delivers the OCL to the end side. The end side adjusts the execution device according to the OCL calculated by the edge side. This implements stable and accurate control of the FT in the MSWI process, resolves a problem of affecting control performance of a predictive controller caused by deteriorating precision of the prediction model due to interference, and can ensure long-term maintenance of a relatively good control effect.

BRIEF DESCRIPTION OF THE DRAWINGS

To describe the technical solutions in embodiments of the present disclosure or in the conventional technology more clearly, the accompanying drawings required in the embodiments are briefly described below. Apparently, the accompanying drawings in the following description show merely some embodiments of the present disclosure, and other drawings can still be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The present disclosure aims to provide an end-edge-cloud collaborative FT control method and system in an MSWI process, to improve control precision of an FT in the MSWI process.

To make the above objective, features, and advantages of the present disclosure clearer and more comprehensible, the present disclosure will be further described in detail below in combination with accompanying drawings and specific implementations.

Embodiment 1

Figure 1:
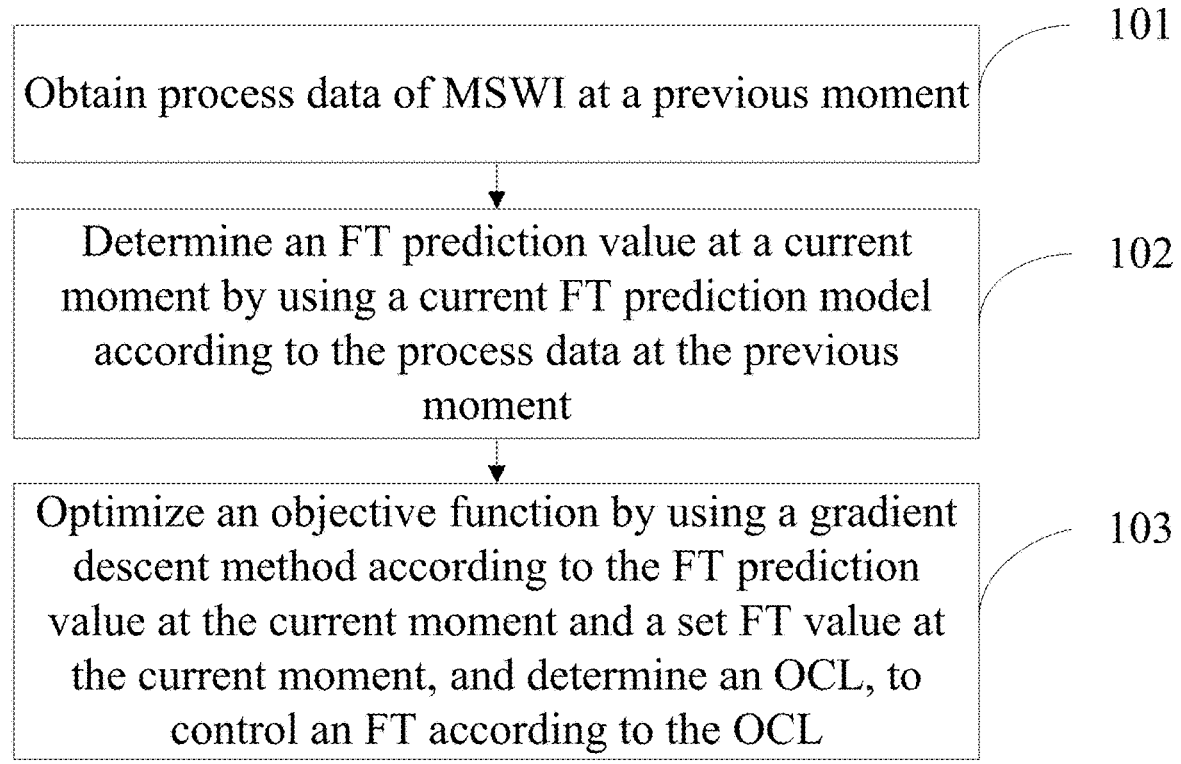
FIG. 1 is a flowchart of an end-edge-cloud collaborative FT control method in an MSWI process according to the present disclosure.

The present disclosure provides an end-edge-cloud collaborative FT control method in an MSWI process. As shown in FIG. 1, the end-edge-cloud collaborative FT control method in an MSWI process includes step 101 to step 103.

Step 101: Obtain process data of MSWI at a previous moment, where the process data includes an FT, a primary air flow, a secondary air flow, a primary air heating temperature, a secondary air heating temperature, and a grate speed.

Step 102: Determine an FT prediction value at a current moment by using a current FT prediction model according to the process data at the previous moment, where the current FT prediction model is obtained by updating a network parameter of an FT prediction model at the previous moment by using an SCM; an FT prediction model at an initial moment is obtained by determining a network structure and a network parameter of an FNN by using a self-organizing mechanism and an improved second-order algorithm based on a sample dataset; the network parameter includes an antecedent parameter and a consequent parameter; the antecedent parameter includes a center vector and a width; the consequent parameter includes a connection weight; the sample dataset includes process data at a historical moment and an expected FT; and the FNN includes an input layer, an RBF layer, a normalized layer, and an output layer.

In an optional implementation, step 102 specifically includes: denoising the process data at the previous moment to obtain denoised process data at the previous moment; and
  determining the FT prediction value at the current moment by using the current FT prediction model according to the denoised process data at the previous moment.

In an optional implementation, a process of constructing the FT prediction model at the initial moment specifically includes: determining an initial network parameter of a first neuron at the normalized layer and an initial network parameter of a first neuron at the RBF layer in an initial FNN according to process data at a historical moment corresponding to a maximum expected FT in the sample dataset, to obtain a current FNN, where quantities of neurons at the normalized layer and the RBF layer in the initial FNN are both 0;
  adjusting an initial network parameter of the current FNN by using the improved second-order algorithm, to obtain an adjusted FNN;
  inputting process data at each historical moment to the adjusted FNN to obtain a predicted FT;
  determining an error between the predicted FT and the expected FT corresponding to the process data at the historical moment;
  determining an initial network parameter of a next neuron at the normalized layer and an initial network parameter of a next neuron at the RBF layer according to process data at a historical moment corresponding to a peak point of the error, to obtain a next FNN; and determining whether a quantity of neurons at the normalized layer of the next FNN reaches a quantity threshold or whether prediction precision of the next FNN reaches a precision threshold; and if yes, pruning the neurons at the normalized layer and the neurons at the RBF layer according to activation strength of the neurons at the normalized layer, to obtain the FT prediction model at the initial moment; or if no, using the next FNN as the current FNN, and returning to the step of "adjusting an initial network parameter of the current FNN by using the improved second-order algorithm, to obtain an adjusted FT prediction model".

In an optional implementation, the updating a network parameter of an FT prediction model at the previous moment by using an SCM specifically includes: determining activation strength of all fuzzy rules in the FT prediction model at the previous moment; and determining whether the activation strength is greater than an activation strength threshold; and if yes, updating, by using a least squares method, a consequent parameter of a fuzzy rule that is in the FT prediction model at the previous moment and whose activation strength is greater than the activation strength threshold, to obtain an FT prediction model at the current moment; or if not, updating, by using the improved second-order algorithm, antecedent parameters and consequent parameters of all fuzzy rules of the FT prediction model at the previous moment, to obtain an FT prediction model at the current moment.

Step 103: Optimize an objective function by using a gradient descent method according to the FT prediction value at the current moment and a set FT value at the current moment, and determine an OCL, to control the FT according to the OCL, where the OCL includes a primary air flow adjustment amount, a secondary air flow adjustment amount, and a primary air heating temperature adjustment amount.

In an optional implementation, the objective function is as follows:

$$\hat{J}(t) = \rho_0 [r(t) - \hat{y}(t)]^T [r(t) - \hat{y}(t)] + \sum_{i=1}^{3} \rho_i \Delta u_i(t)^T \Delta u_i(t),$$

where r(t) is a vector of a set FT value at a moment t; ŷ(t) is a vector of an FT prediction value at the moment t; $\Delta u_i(t)$ is an adjustment amount vector of an i-th control variable at the moment t, where i=1, 2, 3, and the control variable is a primary air flow, a secondary air flow, or a primary air heating temperature; $\rho_0$ and $\rho_i$ are control weight factors; and T represents transposition.

Embodiment 2

The present disclosure further provides an end-edge-cloud collaborative FT control system in an MSWI process, to implement stable and accurate control of an FT in the MSWI process.

Figure 2:
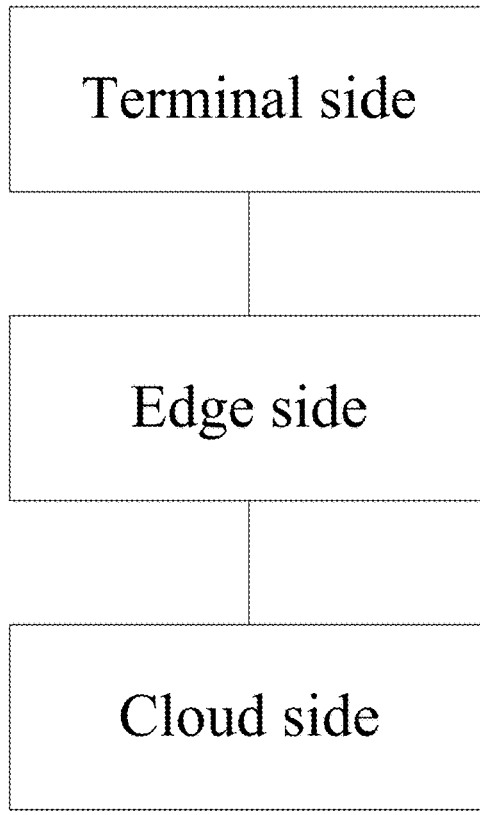
FIG. 2 is a structural diagram of an end-edge-cloud collaborative FT control system in an MSWI process according to the present disclosure.
Figure 3:
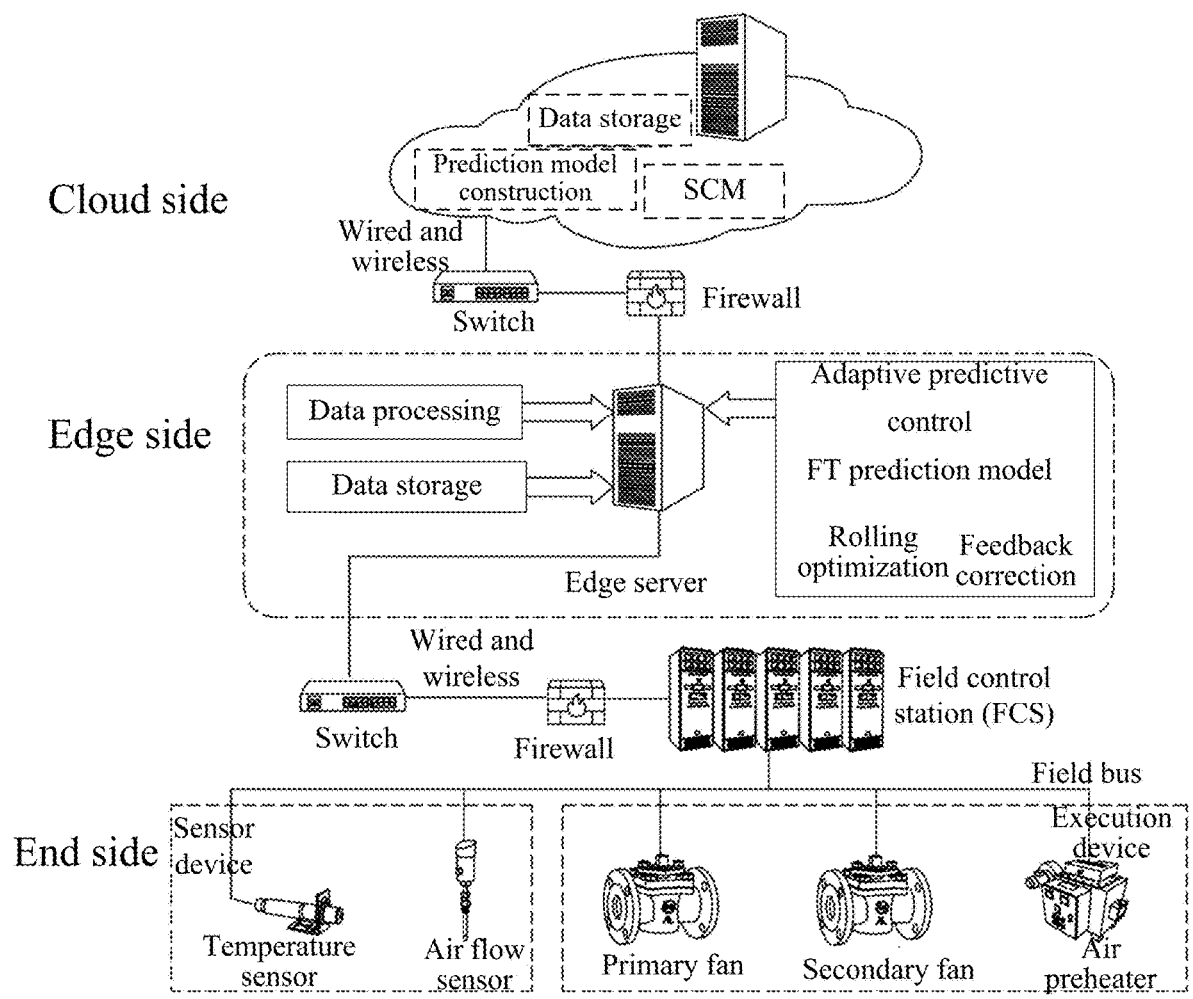
FIG. 3 is a schematic diagram of an end-edge-cloud collaborative FT control system in an MSWI process according to Embodiment 1.

As shown in FIG. 2 and FIG. 3, the end-edge-cloud collaborative FT control system in an MSWI process provided in the present disclosure includes: an end side, an edge side, and a cloud side connected in sequence.

The end side includes sensing devices and execution devices; the sensing devices include a temperature sensor and an air flow sensor; the sensing device is configured to acquire process data at each moment of MSWI; and the execution devices include a primary fan, a secondary fan, and an air preheater.

In actual application, the end side is configured to: obtain process data of the MSWI process in real time, and execute a control instruction delivered by the edge side.

The end side refers to an end device, including the sensing devices such as the temperature sensor, the air flow sensor, and the execution devices such as the primary fan, the secondary fan, and the air preheater. The sensing device acquires the process data of the MSWI process, and the execution device executes of the control instruction.

The edge side is configured to store the process data at each moment, and is configured to: obtain process data of MSWI at a previous moment, where the process data includes an FT, a primary air flow, a secondary air flow, a primary air heating temperature, a secondary air heating temperature, and a grate speed;

determine an FT prediction value at a current moment by using a current FT prediction model according to the process data at the previous moment, where the current FT prediction model is obtained by updating a network parameter of an FT prediction model at the previous moment by using an SCM; an FT prediction model at an initial moment is obtained by determining a network structure and a network parameter of an FNN by using a self-organizing mechanism and an improved second-order algorithm based on a sample dataset; the network parameter includes an antecedent parameter and a consequent parameter; the antecedent parameter includes a center vector and a width; the consequent parameter includes a connection weight; the sample dataset includes process data at a historical moment and an expected FT; and the FNN includes an input layer, an RBF layer, a normalized layer, and an output layer;

optimize an objective function by using a gradient descent method according to the FT prediction value at the current moment and a set FT value at the current moment, and determine an OCL, where the OCL includes a primary air flow adjustment amount, a secondary air flow adjustment amount, and a primary air heating temperature adjustment amount, where the objective function considers both a control error and a control variable change; and send the OCL to the end side to control the FT.

In actual application, the edge side includes an edge server, and the edge server is configured to: process and transmit acquired process data in real time, and send the process data to a cloud server; predict the FT of the MSWI process based on a self-organizing FNN prediction model, and solve the OCL based on an adaptive predictive controller; and send the OCL to the end side.

The cloud side is configured to: determine the network structure and the network parameters of the FNN based on the sample dataset by using the self-organizing mechanism and the improved second-order algorithm, to obtain the FT prediction model at the initial moment; update the network parameter of the FT prediction model at the previous moment by using the SCM, to obtain an FT prediction model at the current moment; and send the FT prediction model at the current moment to the edge side.

In actual application, the cloud side includes the cloud server. The cloud server is configured to: store the transmitted process data, establish the self-organizing FNN prediction model based on the self-organizing mechanism and the improved second-order algorithm, update a parameter of the prediction model by using the SCM, and deliver an updated model to the edge side in a timely manner.

Figure 4:
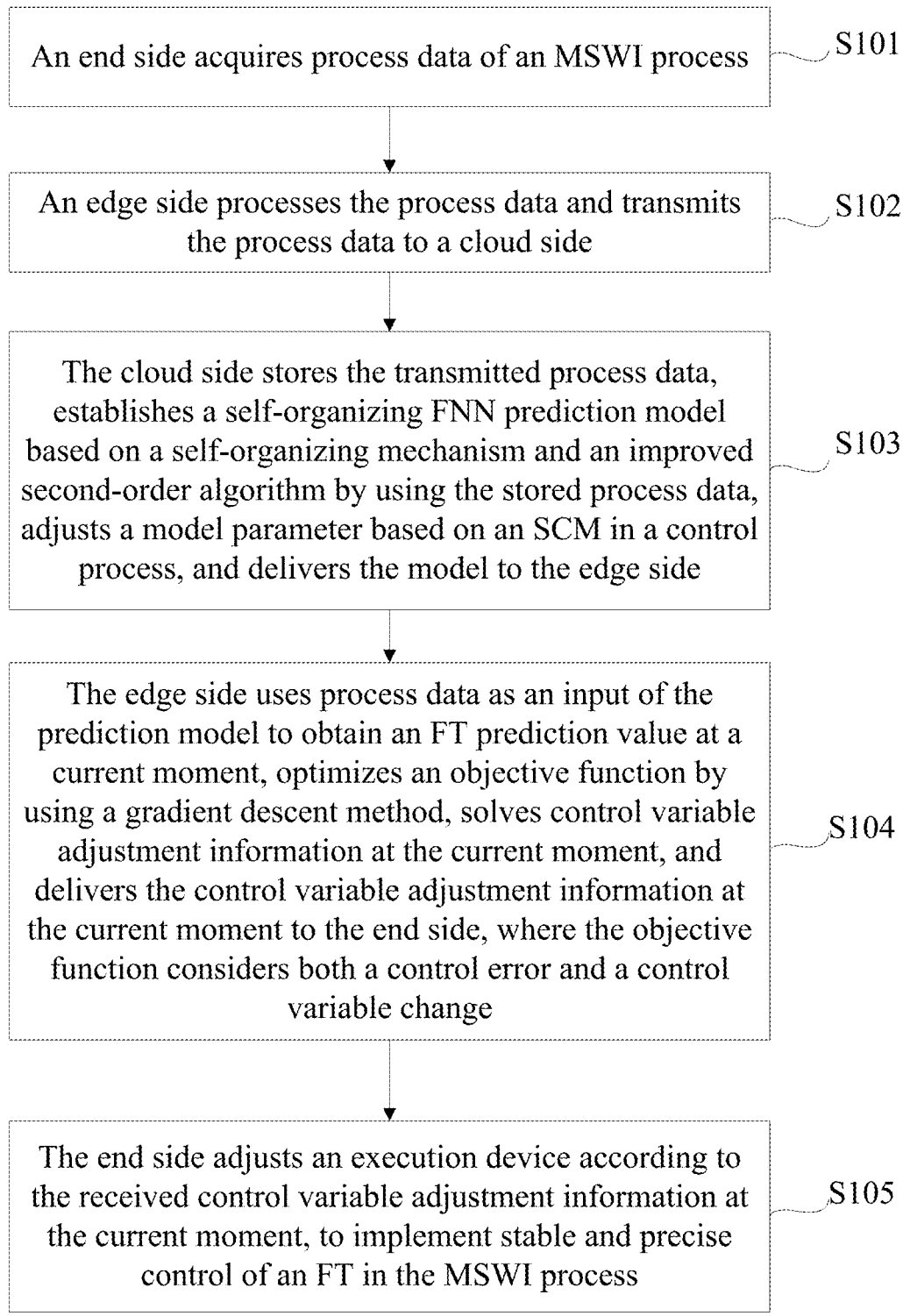
FIG. 4 is a flowchart of an end-edge-cloud collaborative FT control policy in an MSWI process according to Embodiment 2.
Figure 5:
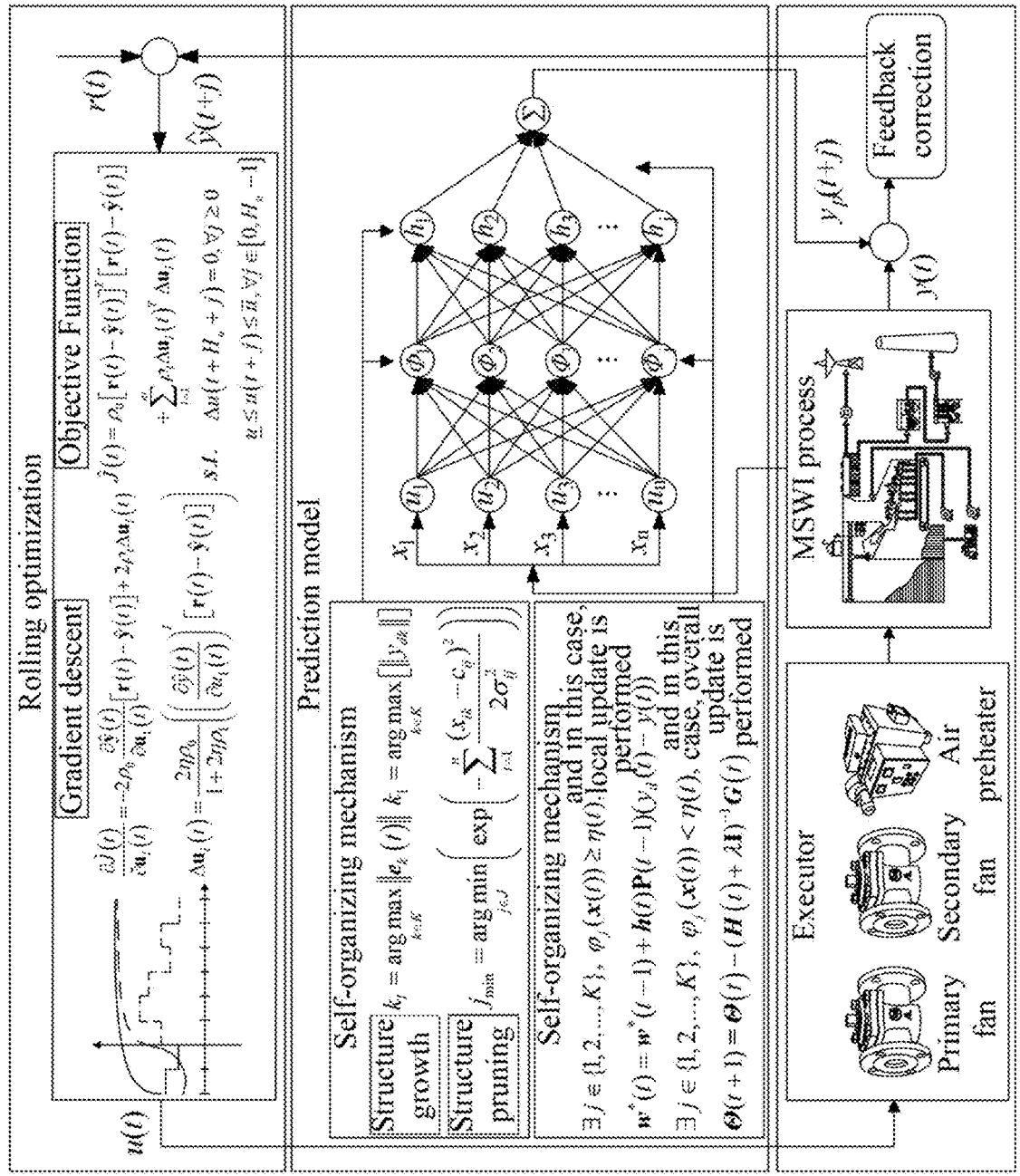
FIG. 5 is a framework diagram of an end-edge-cloud collaborative FT control policy in an MSWI process according to Embodiment 2.

In actual application, as shown in FIG. 4 and FIG. 5, an end-edge-cloud collaborative FT control method in an MSWI process includes the following steps.

S101. An end side acquires process data of the MSWI process.

Specifically, in this embodiment, sensing devices such as a temperature sensor and an air flow sensor on the end side acquire the process data of the MSWI process. The process data includes an FT, a primary air flow, a secondary air flow, a primary air heating temperature, a secondary air heating temperature, and a grate speed.

S102. An edge side processes the process data and transmits the process data to a cloud side.

Specifically, in this embodiment, an edge server on the edge side performs preprocessing such as data denoising on the process data of the MSWI process, and transmits processed process data to a cloud server on the cloud side.

S103. The cloud side stores the transmitted process data, establishes a self-organizing FNN prediction model based on a self-organizing mechanism and an improved second-order algorithm by using the stored process data, adjusts a network parameter based on an SCM in a control process, and delivers the model to the edge side.

Specifically, in this embodiment, the cloud server on the cloud side stores the transmitted process data. The FT prediction model may be established by using the following steps.

S1. A network structure of the prediction model (an FNN) used for FT predicting in the MSWI process includes four layers: an input layer, an RBF layer, a normalized layer, and an output layer. Quantities of neurons at the normalized layer and the RBF layer in an initial FNN are both 0. An initial parameter of a first neuron at each of the RBF layer and the normalized layer is determined according to a sample of a maximum absolute output value (a maximum expected FT) in sample data.

S2. Adjust a network parameter of the initial FNN by using the improved second-order algorithm, to obtain a predicted output of an adjusted FNN, and calculate an error based on the predicted output and an expected output (an expected FT) of sample data obtained in advance.

S3. Determine, according to a peak point of the error, sample data corresponding to the peak point, and determine an initial parameter of a next neuron at each of the RBF layer and the normalized layer based on the determined sample data.

S4. Repeat S2-S3 until the quantity of neurons at the normalized layer reaches a quantity threshold or precision of a temperature prediction model (the adjusted FNN) reaches a precision threshold.

S5. Prune the neurons at the normalized layer based on activation strength of the neurons at the normalized layer to obtain an established FT prediction model.

In this embodiment, the error is calculated based on the predicted output and the expected output of the sample data obtained in advance, prediction precision of the FT prediction model is measured by using a cumulative error, and an activation strength threshold is set based on the prediction precision. Activation strength of all fuzzy rules in a current network is calculated according to current sample data, and the activation strength is compared with the activation strength threshold. If there is a rule whose activation strength is greater than the activation strength threshold, a consequent parameter (a connection weight) of the rule meeting the condition is updated by using a least squares method. If all the rules whose activation strength is less than the activation strength threshold, antecedent and consequent parameters (center vectors, widths, connection weights) of all the rules are updated by using the improved second-order algorithm.

A fuzzy rule is a basic unit that describes a relationship between an input and an output. The normalized layer is responsible for managing and processing these fuzzy rules and applying the fuzzy rules to input data to generate corresponding outputs. The normalized layer and the fuzzy rules work together to enable the FNN to handle fuzzy inputs and outputs.

Activation strength of all current fuzzy rules is calculated. Activation strength of a j-th fuzzy rule is set as an output of a j-th neuron at the RBF layer.

The cumulative error is defined as:

$$\mathcal{E}(t) = \sum_{i=1}^{t} \lambda^{t-i} |e_i(t)|.$$

In the formula, $\mathcal{E}(t)$ is a cumulative error of sample data at moments t; $e_i(t)$ is an error of sample data at a t-th moment, where i=1, ..., t; and $\lambda$ is a forgetting factor, where $\lambda \in (0,1)$.

A relationship between the activation strength threshold $\eta(t)$ and the cumulative error $\mathcal{E}(t)$ is as follows.

$$\eta(t) = \eta_{max}\left(\frac{2}{1+\exp(-\mathcal{E}(t))} - 1\right)$$

In the formula, $\eta_{max}$ is a maximum value of the activation strength threshold.

More specifically, in this embodiment, the consequent parameter, namely, a connection weight $w_t$, of the rule meeting the condition is adjusted by using the least squares method, to obtain an adjusted parameter $w_{t+1}$.

$$w_{t+1} = w_t + h(t)P(t-1)(y_d(t) - y_p(t)); \text{ and}$$

$$P(t) = P(t-1) - \frac{P(t-1)h(t)h(t)^T P(t-1)}{1 + h(t)^T P(t-1)h(t)},$$

where
$w_t = [w_1, \ldots, w_j, \ldots, w_K]$; K is a quantity of rules whose activation strength is greater than the activation strength threshold; h(t) is an output matrix of the normalized layer; P is a covariance matrix, and when t is 0, a covariance matrix $P(0) = \alpha I$, where a is a positive number with a relatively large value and $\alpha = 10^4$, I is a unit matrix; P(t−1) is a covariance matrix at a moment (t−1); P(t) is a covariance matrix at a moment t; and $y_d(t)$ and $y_p(t)$ respectively represent an expected output and a predicted output.

More specifically, in this embodiment, the antecedent and consequent parameters, namely, center vectors $c_t$, connection weights $w_t$, and widths $\sigma_t$, of all the rules are adjusted by using the improved second-order algorithm, to obtain an adjusted parameter $\Theta(t+1)$.

$$\Theta(t+1) = \Theta(t) - (H(t) - \eta_1 I)^{-1} G(t)$$

In the formula, $\Theta(t)=[w_t, c_t, \sigma_t]$, $\Theta(t+1)=[w_{t+1}, c_{t+1}, \sigma_{t+1}]$, H(t) is a Hessian-like matrix, G(t) is a gradient vector, I is a unit matrix, and $\eta_1$ a learning rate used in the improved second-order algorithm.

In this embodiment, to reduce computational complexity, the Hessian-like matrix H(t) and the gradient vector G(t) may be respectively calculated as sums of corresponding sub-Hessian matrices $q_p$ and sub-gradient vectors $\eta_p$.

$$H(t) = \sum_{p=1}^{P} q_p(t)$$

$$G(t) = \sum_{p=1}^{P} \eta_P(t)$$

$$q_P(t) = j_p^T(t) j_p(t)$$

$$\eta_p(t) = j_p^T(t) E(t)$$

In the formula, $j_p(t)$ is a Jacobian vector of a p-th sample data.

$$j_p(t) = \begin{bmatrix} \frac{\partial E(t)}{\partial w_1}, \dots, \frac{\partial E(t)}{\partial w_j}, \dots, \frac{\partial E(t)}{\partial w_M}, \\ \frac{\partial E(t)}{\partial c_{11}}, \dots, \frac{\partial E(t)}{\partial c_{ij}}, \dots, \frac{\partial E(t)}{\partial c_{nM}}, \\ \frac{\partial E(t)}{\partial \sigma_{11}}, \dots, \frac{\partial E(t)}{\partial \sigma_{ij}}, \dots, \frac{\partial E(t)}{\partial \sigma_{nM}} \end{bmatrix}$$

In the formula, the error function E(t) is:

$$E(t) = \frac{1}{2}(y_d(t) - y_p(t))^T (y_d(t) - y_p(t))$$

S104. The edge side uses process data at a previous moment as an input of the prediction model to obtain an FT prediction value at a current moment, optimizes an objective function (an FT control objective function) by using a gradient descent method, solves control variable adjustment information at the current moment, and delivers the control variable adjustment information at the current moment to the end side. The objective function considers both a control error and a control variable change.

Specifically, in this embodiment, the process data at the previous moment is an FT y(t−1) at a moment (t−1) in the MSWI process, a primary air flow $u_1(t-1)$ at the moment (t−1) in the MSWI process, a secondary air flow $u_2(t-1)$ at the moment (t−1) in the MSWI process, a primary air heating temperature $u_3(t-1)$ at the moment (t−1) in the MSWI process, a secondary air heating temperature $u_4(t-1)$ at the moment (t−1) in the MSWI process, and a grate speed $u_5(t-1)$ at the moment (t−1) in the MSWI process.

In this embodiment, the FT control objective function considers both the control error and the control variable change.

Specifically, the FT control objective function $\hat{J}(t)$ is defined as:

$$\hat{J}(t) = \rho_0 [r(t) - \hat{y}(t)]^T [r(t) - \hat{y}(t)] + \sum_{i=1}^{3} \rho_i \Delta u_i(t)^T \Delta u_i(t).$$

In the formula, r(t) is a vector of a set FT value at a moment t, $\hat{y}(t)$ is a vector of an FT prediction value at the moment t, $\Delta u_i(t)$ is an adjustment vector of an i-th control variable at the moment t, and $\rho_0$ and $\rho_i$ are control weight factors.

More specifically, $r(t)=[r(t+1), r(t+2), \dots, r(t+H_P)]^T$ is the vector of the set FT value at the moment t, $\hat{y}(t)=[\hat{y}(t+1), \hat{y}(t+2), \dots, \hat{y}(t+H_P)]^T$ is the vector of the FT prediction value at the moment t, and $\Delta u_i(t)=[\Delta u_i(t+1), \Delta u_i(t+2) \dots, \Delta u_i(t+H_P)]^T$ is the adjustment vector of the i-th control variable at the moment t. Specifically, it may be as follows: $\Delta u_1(t)$ is an adjustment vector of a primary air flow at the moment t; $\Delta u_2(t)$ is an adjustment vector of a secondary air flow at the moment t; $\Delta u_3(t)$ is an adjustment vector of a primary air heating temperature at the moment t; $H_p$ is a prediction horizon, where $H_p=[1,10]$; and $H_u$ is a control horizon, where $H_u=[1,5]$, and $H_u \leq H_p$. T is a transposition of the formula; and $\rho_0, \rho_1, \rho_2,$ and $\rho_3$ are control weight factors, which are usually positive numbers. In this embodiment, it is set as follows: the prediction horizon $H_p=3$, the control horizon $H_u=1$, and the control weight factors $\rho_0=4$, $\rho_1=1$, $\rho_2=1$, and $\rho_3=10$.

Specifically, based on a set FT value at the current moment and the FT prediction value at the current moment, the objective function is scrolling optimized by using a gradient descent algorithm, to solve an OCL. The OCL obtained by the gradient descent algorithm is calculated as follows:

$$\Delta u_1(t) = \frac{2\eta_2 \rho_0}{1 + 2\eta_2 \rho_1}\left(\left(\frac{\partial \hat{y}(t)}{\partial u_1(t)}\right) E(t)\right);$$

$$\Delta u_2(t) = \frac{2\eta_2 \rho_0}{1 + 2\eta_2 \rho_2}\left(\left(\frac{\partial \hat{y}(t)}{\partial u_2(t)}\right) E(t)\right); \text{ and}$$

$$\Delta u_3(t) = \frac{2\eta_2 \rho_0}{1 + 2\eta_2 \rho_3}\left(\left(\frac{\partial \hat{y}(t)}{\partial u_3(t)}\right) E(t)\right),$$

where $\eta_2$ is a learning rate used in the gradient descent algorithm, where $\eta_2 \in [0,1]$; and E(t) is the error between the expected output and the predicted output.

Process data at a next moment is determined according to the solved control law and process data at the current moment.

In this embodiment, first values of $\Delta u_1(t)$ $\Delta u_2(t)$ and $\Delta u_3(t)$ are took as adjustment amount vectors of a controller, that is, the primary air flow, the secondary air flow, and the primary air heating temperature at the moment t in the solid waste incineration process are adjusted.

$$u_1(t+1) = u_1(t) + \Delta u_1(t)$$

$$u_2(t+1) = u_2(t) + \Delta u_2(t)$$

$$u_3(t+1) = u_3(t) + \Delta u_3(t)$$

S105. The end side adjusts an execution device according to the received control variable adjustment information at the current moment, to implement stable and precise control of the FT in the MSWI process.

Specifically, in this embodiment, the end side adjusts an opening degree of an inlet baffle valve of a primary fan in the execution device according to the primary air flow in the OCL calculated on the edge side, adjusts an opening degree of an inlet baffle valve of a secondary fan in the execution device according to the secondary air flow in the OCL calculated on the edge side, and adjusts a heating force of an air preheater in the execution device according to the primary air heating temperature in the OCL calculated on the edge side.

The present disclosure provides the end-edge-cloud collaborative FT control method and system in an MSWI process. The end device obtains the process data of the MSWI process in real time. The edge server processes the acquired process data and transmits the process data to the cloud server. The cloud server stores the received data, establishes the self-organizing FNN prediction model according to the received data, adjusts the network parameter based on the SCM, and delivers the established model to the edge server. The edge server predicts the FT by relying on the prediction model established and updated online on the cloud side, optimizes the objective function by using the gradient descent method, solves the OCL, and delivers the OCL to the end side. The end side adjusts the execution device according to the OCL calculated by the edge server. This implements stable and accurate control of the FT in the MSWI process, resolves a problem of affecting control performance of the predictive controller caused by deteriorating precision of the prediction model due to interference, and can ensure long-term maintenance of a relatively good control effect.

Each embodiment of this specification is described in a progressive manner, each embodiment focuses on the difference from other embodiments, and the same and similar parts between the embodiments may refer to each other.

Specific examples are used herein for illustration of the principles and implementations of the present disclosure. The description of the foregoing embodiments is used to help understand the method of the present disclosure and the core principles thereof. In addition, those of ordinary skill in the art can make various modifications in terms of specific embodiments and scope of application in accordance with the ideas of the present disclosure. In conclusion, the content of this specification shall not be construed as limitations to the present disclosure.

What is claimed is:

1. An end-edge-cloud collaborative furnace temperature (FT) control system in a municipal solid waste incineration (MSWI) process, configured to implement an end-edge-cloud collaborative FT control method in the MSWI process, and comprising: an end side, an edge side, and a cloud side connected in sequence, wherein
  the end side comprises sensing devices and execution devices; the sensing devices comprise a temperature sensor and an air flow sensor; each of the sensing devices is configured to acquire process data at each moment of MSWI; and the execution devices comprise a primary fan, a secondary fan, and an air preheater;
  the edge side is configured to store the process data at each moment, and is configured to:
  obtain process data of MSWI at a previous moment, wherein the process data comprises an FT, a primary air flow, a secondary air flow, a primary air heating temperature, a secondary air heating temperature, and a grate speed;
  determine an FT prediction value at a current moment by using a current FT prediction model according to the process data at the previous moment, wherein the current FT prediction model is obtained by updating a network parameter of an FT prediction model at the previous moment by using a self-correcting mechanism (SCM); an FT prediction model at an initial moment is obtained by determining a network structure and a network parameter of a fuzzy neural network (FNN) by using a self-organizing mechanism and an improved second-order algorithm based on a sample dataset; the network parameter comprises an antecedent parameter and a consequent parameter; the antecedent parameter comprises a center vector and a width; the consequent parameter comprises a connection weight; the sample dataset comprises process data at a historical moment and an expected FT; and the FNN comprises an input layer, a radial basis function (RBF) layer, a normalized layer, and an output layer;
  optimize an objective function by using a gradient descent method according to the FT prediction value at the current moment and a set FT value at the current moment, and determine an optimal control law (OCL), wherein the OCL comprises a primary air flow adjustment amount, a secondary air flow adjustment amount, and a primary air heating temperature adjustment amount; and
  send the OCL to the end side to control the FT; and
  the cloud side is configured to: determine the network structure and the network parameter of the FNN based on the sample dataset by using the self-organizing mechanism and the improved second-order algorithm, to obtain the FT prediction model at the initial moment; update the network parameter of the FT prediction model at the previous moment by using the SCM, to obtain an FT prediction model at the current moment; and send the FT prediction model at the current moment to the edge side; and
  the end-edge-cloud collaborative FT control method in the MSWI process comprises:
  obtaining the process data of MSWI at the previous moment, wherein the process data comprises the FT, the primary air flow, the secondary air flow, the primary air heating temperature, the secondary air heating temperature, and the grate speed;
  determining the FT prediction value at the current moment by using the current FT prediction model according to the process data at the previous moment, wherein the current FT prediction model is obtained by updating the network parameter of the FT prediction model at the previous moment by using the SCM; the FT prediction model at the initial moment is obtained by determining the network structure and the network parameter of the FNN by using the self-organizing mechanism and the improved second-order algorithm based on the sample dataset; the network parameter comprises the antecedent parameter and the consequent parameter; the antecedent parameter comprises the center vector and the width; the consequent parameter comprises the connection weight; the sample dataset comprises process data at the historical moment and the expected FT; and the FNN comprises an input layer, the RBF layer, the normalized layer, and the output layer; and
  optimizing the objective function by using the gradient descent method according to the FT prediction value at the current moment and the set FT value at the current moment, and determining the OCL, to control the FT according to the OCL, wherein the OCL comprises the primary air flow adjustment amount, the secondary air flow adjustment amount, and the primary air heating temperature adjustment amount.

2. The end-edge-cloud collaborative FT control system in the MSWI process according to claim 1, wherein determining the FT prediction value at the current moment by using the current FT prediction model according to the process data at the previous moment comprises:
- denoising the process data at the previous moment to obtain denoised process data at the previous moment; and
- determining the FT prediction value at the current moment by using the current FT prediction model according to the denoised process data at the previous moment.

3. The end-edge-cloud collaborative FT control system in the MSWI process according to claim 1, wherein a process of constructing the FT prediction model at the initial moment comprises:
- determining an initial network parameter of a first neuron at the normalized layer and an initial network parameter of a first neuron at the RBF layer in the initial FNN according to process data at a historical moment corresponding to a maximum expected FT in the sample dataset, to obtain a current FNN, wherein quantities of neurons at the normalized layer and the RBF layer in the initial FNN are both 0;
- adjusting an initial network parameter of the current FNN by using the improved second-order algorithm, to obtain an adjusted FNN;
- inputting process data at each historical moment to the adjusted FNN to obtain a predicted FT;
- determining an error between the predicted FT and the expected FT corresponding to the process data at the historical moment;
- determining an initial network parameter of a next neuron at the normalized layer and an initial network parameter of a next neuron at the RBF layer according to process data at a historical moment corresponding to a peak point of the error, to obtain a next FNN; and
- determining whether a quantity of neurons at the normalized layer of the next FNN reaches a quantity threshold or whether prediction precision of the next FNN reaches a precision threshold; and
- if yes, pruning the neurons at the normalized layer and the neurons at the RBF layer according to activation strength of the neurons at the normalized layer, to obtain the FT prediction model at the initial moment; or
- if no, using the next FNN as the current FNN, and returning to the step of "adjusting an initial network parameter of the current FNN by using the improved second-order algorithm, to obtain an adjusted FT prediction model".

4. The end-edge-cloud collaborative FT control system in the MSWI process according to claim 1, wherein updating the network parameter of the FT prediction model at the previous moment by using the SCM comprises:
- determining activation strength of all fuzzy rules in the FT prediction model at the previous moment; and
- determining whether the activation strength is greater than an activation strength threshold; and
- if yes, updating, by using a least squares method, a consequent parameter of a fuzzy rule that is in the FT prediction model at the previous moment and whose activation strength is greater than the activation strength threshold, to obtain an FT prediction model at the current moment; or
- if not, updating, by using the improved second-order algorithm, antecedent parameters and consequent parameters of all fuzzy rules of the FT prediction model at the previous moment, to obtain an FT prediction model at the current moment.

5. The end-edge-cloud collaborative FT control system in the MSWI process according to claim 1, wherein the objective function is defined as:

$$\hat{J}(t) = \rho_0[r(t) - \hat{y}(t)]^T[r(t) - \hat{y}(t)] + \sum_{i=1}^{3}\rho_i \Delta u_i(t)^T \Delta u_i(t),$$

wherein r(t) is a vector of a set FT value at a moment t; ŷ(t) is a vector of an FT prediction value at the moment t; $\Delta u_i(t)$ is an adjustment amount vector of an i-th control variable at the moment t, wherein i=1, 2, 3, and the control variable is the primary air flow, the secondary air flow, or the primary air heating temperature; $\rho_0$ and $\rho_i$ are control weight factors; and T represents transposition.

* * * * *